United States Patent
Chang et al.

(10) Patent No.: US 9,172,268 B2
(45) Date of Patent: Oct. 27, 2015

(54) PORTABLE ELECTRONIC DEVICE AND WIRELESS CHARGING DEVICE

(71) Applicants: Chih-Wei Chang, New Taipei (TW); Guo-Liang Wan, Shenzhen (CN)

(72) Inventors: Chih-Wei Chang, New Taipei (TW); Guo-Liang Wan, Shenzhen (CN)

(73) Assignees: SHENZHEN FUTAIHONG PRECISION INDUSTRY CO., LTD., Shenzhen (CN); FIH (Hong Kong) Limited, Kowloon (HK)

(*) Notice: Subject to any disclaimer, the term of this patent is extended or adjusted under 35 U.S.C. 154(b) by 372 days.

(21) Appl. No.: 13/655,624

(22) Filed: Oct. 19, 2012

(65) Prior Publication Data
US 2013/0127408 A1 May 23, 2013

(30) Foreign Application Priority Data
Nov. 18, 2011 (CN) .......................... 2011 1 0367937

(51) Int. Cl.
| | |
|---|---|
| H02J 7/08 | (2006.01) |
| H01F 38/00 | (2006.01) |
| H02J 7/02 | (2006.01) |
| H01F 38/14 | (2006.01) |
| H02J 5/00 | (2006.01) |

(52) U.S. Cl.
CPC ................ *H02J 7/025* (2013.01); *H01F 38/14* (2013.01); *H02J 5/005* (2013.01)

(58) Field of Classification Search
CPC ............ H02J 7/025; H02J 7/04; H01F 38/14; H01F 27/42; H04B 5/0037; H04B 5/0031
USPC .......................................... 320/108; 307/104
See application file for complete search history.

(56) References Cited

U.S. PATENT DOCUMENTS

| | | | | | |
|---|---|---|---|---|---|
| 6,016,046 | A | * | 1/2000 | Kaite et al. ..................... | 320/108 |
| 6,040,680 | A | * | 3/2000 | Toya et al. ..................... | 320/108 |
| 7,683,572 | B2 | * | 3/2010 | Toya .............................. | 320/108 |
| 7,696,718 | B2 | * | 4/2010 | Suzuki ........................... | 320/108 |
| 8,115,447 | B2 | * | 2/2012 | Toya et al. ..................... | 320/108 |
| 8,120,317 | B2 | * | 2/2012 | Sip ................................ | 320/108 |
| 2008/0112158 | A1 | * | 5/2008 | Ellis .............................. | 362/158 |
| 2009/0096413 | A1 | * | 4/2009 | Partovi et al. ................. | 320/108 |
| 2010/0257382 | A1 | * | 10/2010 | Azancot et al. ............... | 713/300 |
| 2010/0277004 | A1 | * | 11/2010 | Suzuki et al. ................. | 307/104 |
| 2010/0315039 | A1 | * | 12/2010 | Terao et al. ................... | 320/108 |
| 2011/0115429 | A1 | * | 5/2011 | Toivola et al. ................ | 320/108 |
| 2011/0285210 | A1 | * | 11/2011 | Lemmens et al. ............ | 307/104 |
| 2013/0076308 | A1 | * | 3/2013 | Niskala et al. ................ | 320/108 |

* cited by examiner

*Primary Examiner* — M'Baye Diao
(74) *Attorney, Agent, or Firm* — Novak Druce Connolly Bove + Quigg LLP

(57) ABSTRACT

A portable electronic device includes a housing and at least one charging module installed in the housing. The at least one charging module includes a magnetic induction block and a coil unit positioned beside the magnetic induction block. The coil unit includes a base block and an induction coil coiled around the base block. The induction coil is configured for generating induction current under the action of a charging magnetic filed outside the housing. The magnetic induction block enhances the magnetic filed intensity acting on the induction coil.

7 Claims, 4 Drawing Sheets

PORTABLE ELECTRONIC DEVICE AND WIRELESS CHARGING DEVICE

BACKGROUND

1. Technical Field

The disclosure generally relates to portable electronic devices and charging device for the portable electronic device, and particularly to a wireless charging type portable electronic device and a wireless charging device for charging the portable electronic device.

2. Description of Related Art

A wireless charging type portable electronic device commonly includes an induction coil. The induction coil generates induction current by inducting changes of an external magnetic field, and charges a battery of the portable electronic device with the induction current. However, the magnetic field intensity of the external magnetic field is limited. Only a small number of the magnetic induction lines emitting from the magnetic field can pass through the induction coil and be converted into electric power. Most of the magnetic induction lines may be dispersed or absorbed by other electronic elements. To convert more energy from the magnetic field into electrical energy, the induction coil may be lengthened with more coils. However, the lengthened induction coil may increase power consumption during output of the induction current to the battery and lead to a low charging efficiency.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
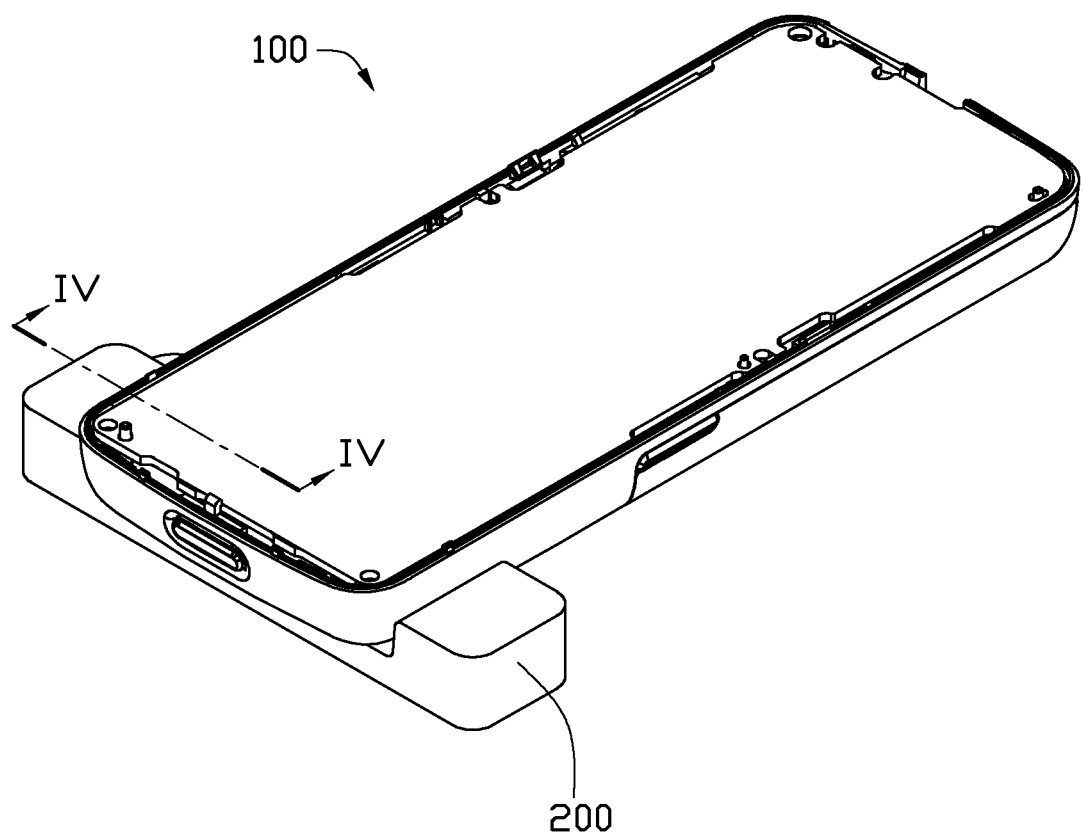
FIG. 1 is a schematic view of a portable electronic device and a wireless charging device for the portable electronic device, according to an exemplary embodiment of the disclosure.

FIG. 1 is a schematic view of a portable electronic device 100 and a wireless charging device 200 for charging the portable electronic device 100, according to an exemplary embodiment of the disclosure. Also referring to FIG. 2, the portable electronic device 100 includes a housing 10, two charging modules 30, and a circuit board 50. The two charging modules 30 are installed in the housing 10 and are configured for generating induction current under the action of a changing magnetic field outside the housing 10 and charging a battery (not shown) of the portable electronic device 10 by a charging circuit set on the circuit board 50.

Figure 2:
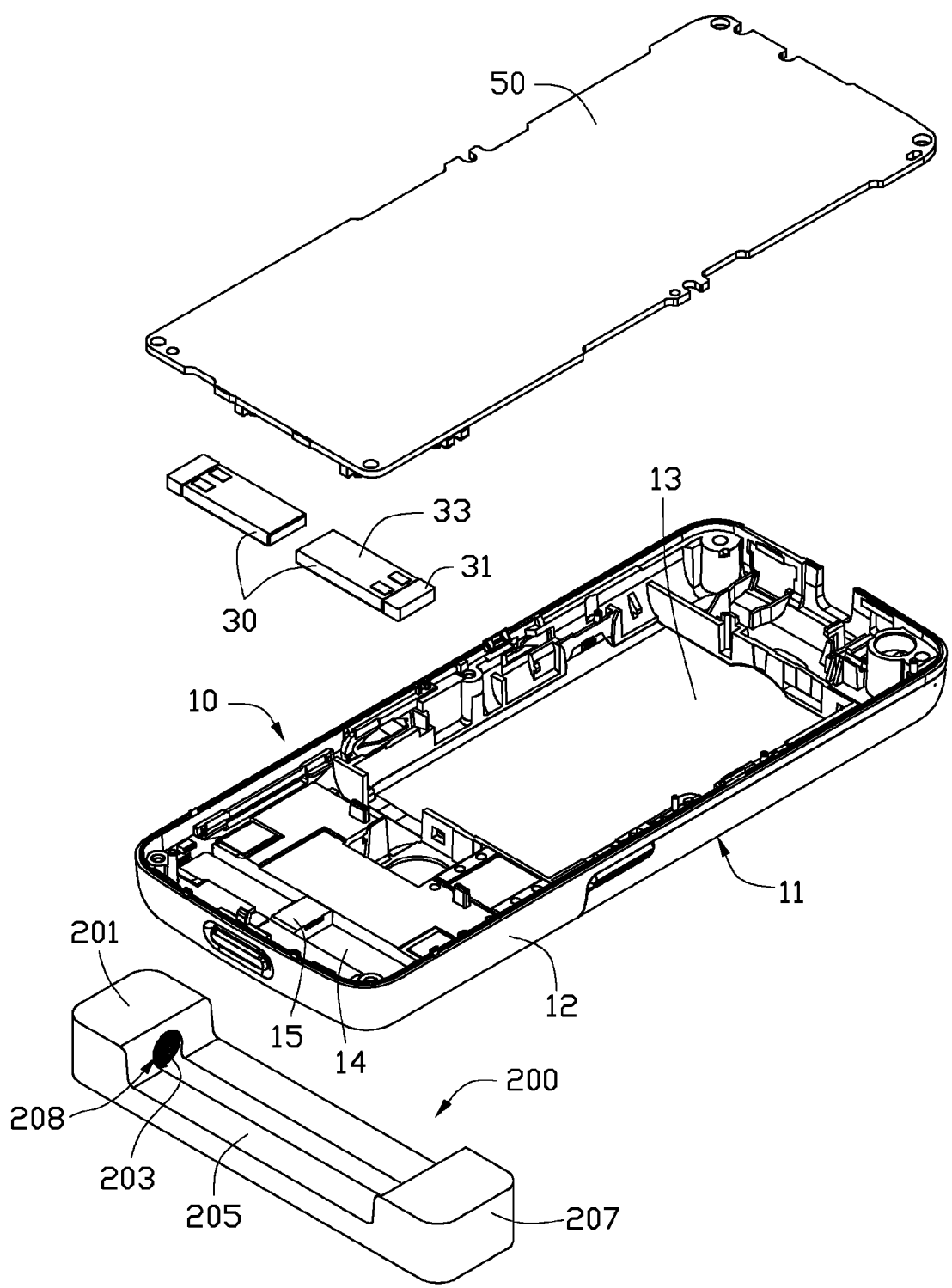
FIG. 2 is a disassembled view of the portable electronic device and the wireless charging device of FIG. 1, according to an exemplary embodiment of the disclosure.

Referring to FIG. 2, the housing 10 includes a base board 11 and a sidewall 12 extending from the periphery of the base board 11. The base board 11 defines a battery chamber 13 at one end of the base board 11 for receiving the battery. The base board 11 also defines two receiving chambers 14 at another end of the base board 11 for receiving the charging modules 30. The two receiving chambers 14 are spaced apart by a spacer 15. Other components (not shown) such as a speaker module, an antenna module, etc. are also installed in the base board 11 and the sidewall 12.

Each charging module 30 includes a magnetic induction block 31 and a coil unit 33 positioned beside the magnetic induction block 31. The magnetic induction block 31 may be a metal block. The magnetic induction block 31 can be magnetized by the external magnetic field and absorbs magnetic induction lines emitting from the external magnetic field to densely pass through the coil unit 33 to enhance the magnetic field intensity acting on the coil unit 33. Therefore, the induction current generated by the coil unit 33 can be increased.

Figure 3:
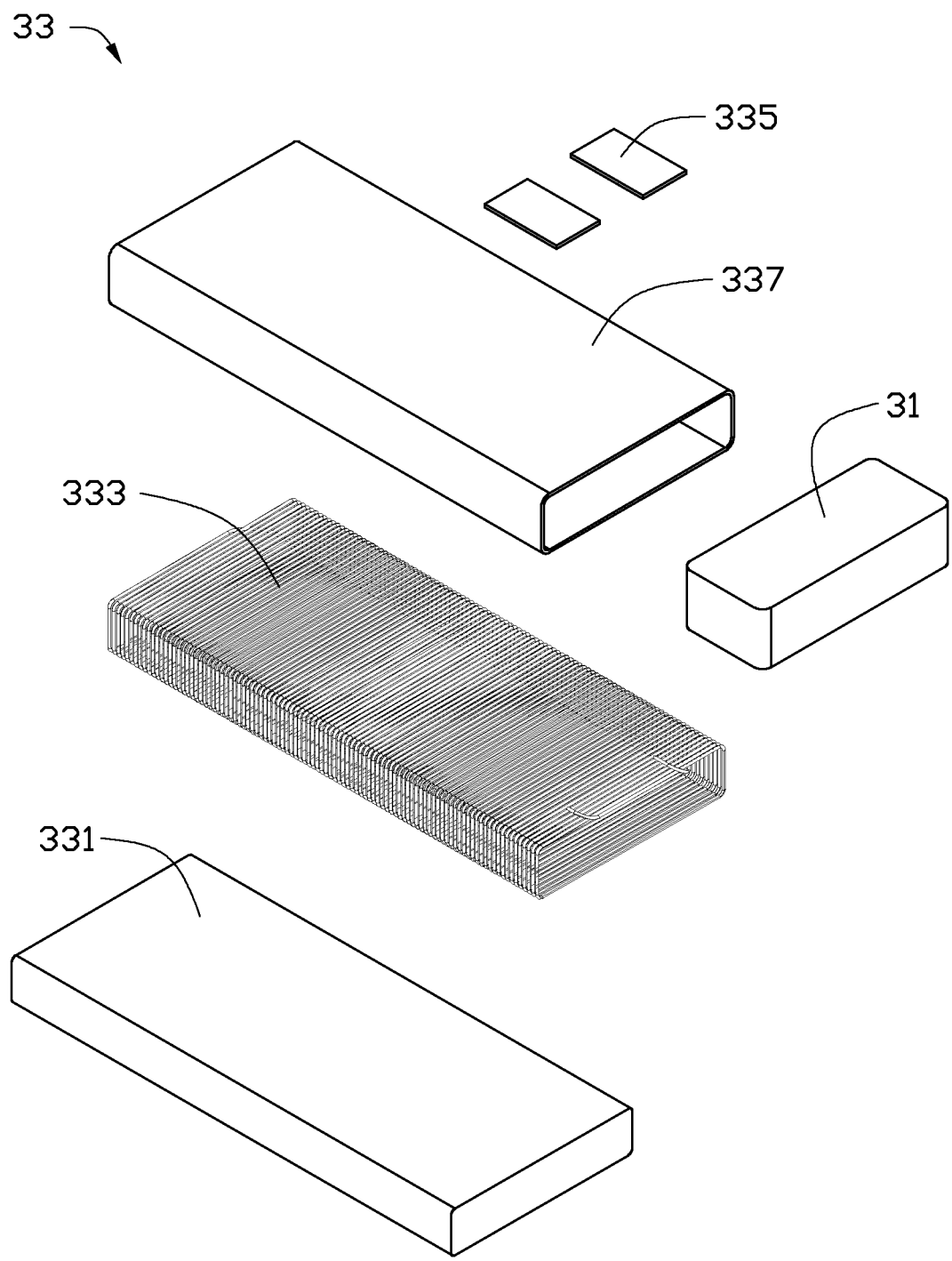
FIG. 3 is a disassembled view of a coil unit of the portable electronic device shown in FIG. 1, according to an exemplary embodiment of the disclosure.

Referring to FIG. 3, each coil unit 33 includes a base block 331, an induction coil 333, two contact pads 335 and a protective cover 337. The base block 331 is substantially a rectangular solid. The induction coil 333 is coiled around the base block 331. The induction coil 333 inducts the changes of the magnetic field outside the housing 10 and generates the induction current. The protective cover 337 is sleeved outside the induction coil 333 to prevent the induction coil 333 from short-circuiting due to wear. The two contact pads 335 are respectively positioned at one end of the protective cover 337 facing the circuit board 50 (best shown in FIG. 2) and configured for electrically connecting the induction coil 333 to the circuit board 50. In addition, the direction current of the induction current of the induction coil 333 can be adjusted by connecting the pathways between the connecting pads 335 and the circuit board 50.

Each charging module 30 is received in one corresponding receiving chamber 14 with the magnetic induction block 31 of each charging module 30 aligning with its corresponding coil unit 33. One end of each magnetic induction block 31 attaches to the sidewall 12. Another end of each magnetic induction block 31 abuts against one end of its corresponding coil unit 33. Another end of each coil unit 33 attaches to the spacer 15.

In one exemplary embodiment, the end of the magnetic induction block 31 corresponding to the sidewall 12 is attached close to the sidewall 12 to reduce a distance between the magnetic induction block 31 and the magnetic field outside the housing 10. Therefore, the coil unit 33 can sensitively induct the change of the magnetic field outside the housing 10.

To assemble the wireless communication device 100, each charging module 30 is respectively received in one of the two receiving chambers 14 with its contact pads 335 facing the circuit board 50. The magnetic induction block 31 of each charging module 30 aligns with its corresponding coil unit 33. One end of each magnetic induction block 31 attaches to the sidewall 12. Another end of each magnetic induction block 31 abuts against one end of its corresponding coil unit 33. Another end of each coil unit 33 attaches to the spacer 15. The circuit board 50 is installed in the housing 10 and electrically connected to the induction coils 333 and the battery.

Figure 4:
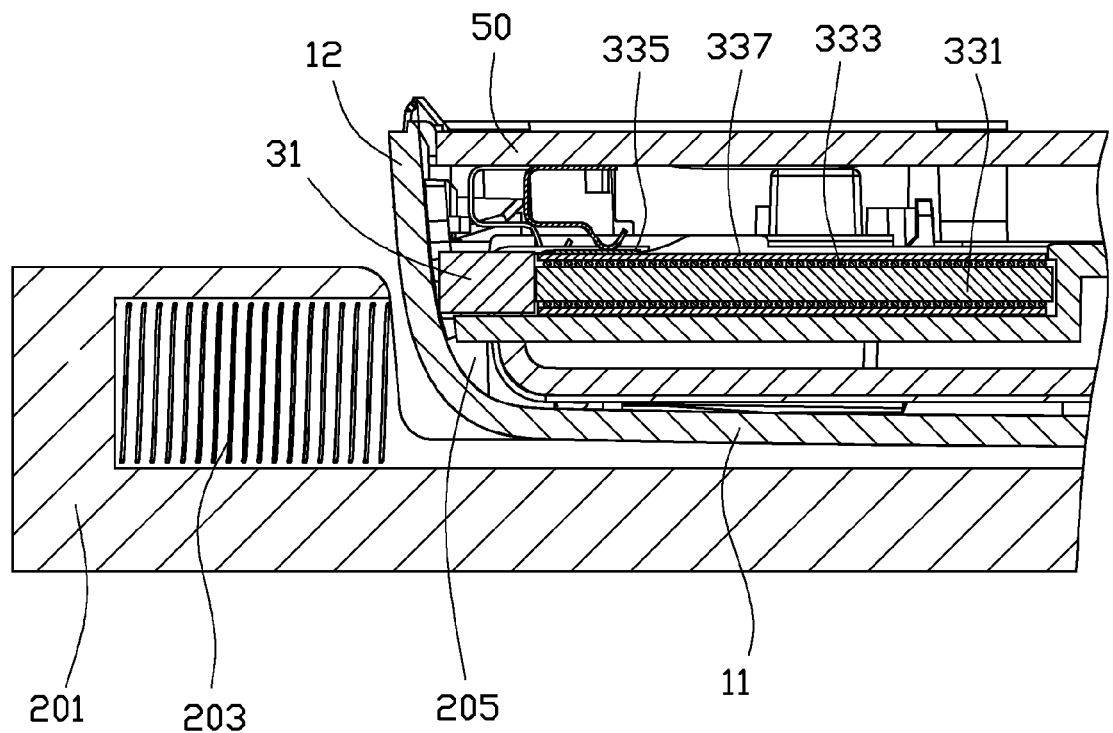
FIG. 4 is an enlarged, cross-sectional view of the portable electronic device of FIG. 1 taken along a line IV-IV, according to an exemplary embodiment of the disclosure.

Referring to FIG. 1 and FIG. 4, the charging device 200 includes a charging cradle 201 and two charging coils 203. The charging cradle 201 is substantially U-shaped. A middle portion of the charging cradle 201 is recessed to form a positioning slot 205 and two protruding blocks 207 are symmetrically positioned at two sides of the positioning slot 205. Each protruding block 207 defines a receiving slot 208. The charging coils 203 are received in the receiving slot 208. The charging coils 203 are electrically connected to a changing power supply to generate the changing external magnetic field for the portable electronic device 100. The changing power supply may be an alternating current (AC) power supply or a direct current (DC) power supply with changing current values. The charging coils 203 may be two coils 203 formed by coiling two separate lines or two coils 203 formed by coiling a line.

To charge the portable electronic device 100, the portable electronic device 100 is positioned at the positioning slot 205 and supported by the charging cradle 201. Each charging module 30 aligns with the corresponding charging coil 203. The changing power supply is applied to the charging coils 203. The charging coils 203 generate the changing magnetic fields outside the housing 10. The magnetic induction block 31 is magnetized to absorb magnetic induction lines emitting from the external magnetic field to densely pass through the coil unit 33. Therefore, the magnetic field intensity acting on the coil unit 33 is enhanced to increase to the induction current generated by the coil unit 33. The increased induction current flows into the circuit board 50 via the contact pads 335 and charges the battery.

The portable electronic device 100 enhances the magnetic field intensity acting on the coil unit 33 with the magnetic induction block 31 to increase the induction current and has a higher charging efficiency.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A wireless charging device for charging a portable electronic device, comprising:
    a charging cradle defining a positioning slot configured for positioning the portable electronic device and forming two protruding blocks positioned at two sides of the positioning slot; and
    at least one charging coil received in one of the protrusions, the at least one charging coil generating a changing magnetic field for charging the portable electronic device when a changing power supply is applied to the charging coils.

2. The wireless charging device of claim 1, wherein the wireless charging device comprises two charging coils, each charging coil received in one of the protruding blocks.

3. The wireless charging device of claim 2, wherein the two charging coils are selected from one of two coils formed by coiling two separate lines and two coils formed by coiling a line.

4. The wireless charging device of claim 2, wherein the changing power supply is selected from one of an alternating current power supply and a direct current power supply with changing current values.

5. A portable electronic device, comprising:
    two charging modules, each charging module comprising a magnetic induction block and a coil unit positioned beside the magnetic induction block; and
    a housing, the housing defining two receiving chambers corresponding to the two charging modules;
    wherein the two receiving chambers are spaced apart by a spacer; each charging module is received in one of the receiving chambers, one end of each magnetic induction block attaches to a sidewall of the housing, another end of each magnetic induction block abuts against one end of its corresponding coil unit, another end of each coil unit attaches to the spacer;
    wherein, each coil unit comprises a base block and an induction coil coiled around the base block, the induction coil is configured for generating induction current under the action of a charging magnetic field outside the housing, the magnetic induction block enhances a magnetic field intensity acting on the induction coil.

6. The portable electronic device of claim 5, wherein the coil unit further comprises a protective cover sleeved outside the induction coil to protect the induction coil.

7. The portable electronic device of claim 6, wherein the coil unit further comprises two contact pads positioned on the protective cover and configured for electrically connecting the induction coil to a circuit board.

* * * * *